United States Patent
Fuse

(10) Patent No.: US 6,922,029 B2
(45) Date of Patent: Jul. 26, 2005

(54) DC MOTOR DRIVER

(75) Inventor: Hiroshi Fuse, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/767,721

(22) Filed: Jan. 30, 2004

(65) Prior Publication Data

US 2004/0183488 A1 Sep. 23, 2004

(30) Foreign Application Priority Data

Feb. 6, 2003 (JP) ........................................ 2003-029581

(51) Int. Cl.$^7$ ................................................ H02P 5/06
(52) U.S. Cl. ........................ 318/254; 318/439; 318/599; 318/437
(58) Field of Search ................................ 318/138, 245, 318/254, 439, 599, 705, 721

(56) References Cited

U.S. PATENT DOCUMENTS

| | | | | |
|---|---|---|---|---|
| 3,999,108 A | * | 12/1976 | Tanikoshi | 318/138 |
| 4,386,305 A | * | 5/1983 | Kohzai et al. | 318/571 |
| 4,804,892 A | * | 2/1989 | Muller | 318/254 |
| 5,162,709 A | * | 11/1992 | Ohi | 318/254 |
| 5,173,645 A | * | 12/1992 | Naito | 318/138 |
| 5,847,521 A | * | 12/1998 | Morikawa et al. | 318/254 |
| 6,054,820 A | * | 4/2000 | Toyoizumi | 318/254 |
| 6,072,288 A | * | 6/2000 | Izumisawa et al. | 318/254 |
| 6,154,002 A | * | 11/2000 | Izumisawa et al. | 318/721 |
| 6,512,343 B1 | * | 1/2003 | Yasohara | 318/437 |
| 6,534,948 B2 | * | 3/2003 | Ohura et al. | 318/798 |
| 6,812,667 B2 | * | 11/2004 | Yasohara et al. | 318/599 |
| 6,828,752 B2 | * | 12/2004 | Nakatsugawa et al. | 318/801 |
| 2004/0007998 A1 | * | 1/2004 | Yasohara et al. | 318/437 |
| 2004/0056632 A1 | * | 3/2004 | Nakatsugawa et al. | 318/801 |

* cited by examiner

*Primary Examiner*—Paul Ip
(74) *Attorney, Agent, or Firm*—Fitzpatrick, Cella, Harper & Scinto

(57) ABSTRACT

In a DC motor driven by sinewave power-on driving and having hall elements shift-mounted relative to a stator for detecting the position of a rotor, a reduction in starting torque is eliminated by avoiding a braking action occurring when switching phases on starting the motor. In the case of the sinewave power-on driving, the braking action may occur owing to delay of the current flowing through the windings of the motor by the influence of an inductance value of stator windings and induced voltage of the motor. In order to avoid the braking action, hall elements for detecting the position of the rotor are shift-mounted. However, the braking action would be likely to occur on the contrary, because the induced voltage is low when the motor is started. To solve this problem, according to the invention the 120 ° rectangular wave power-on driving is executed for starting the motor until the number of revolutions of the motor has attained a predetermined value after starting, thereby reducing the undesirable braking action.

2 Claims, 7 Drawing Sheets

DC MOTOR DRIVER

BACKGROUND OF THE INVENTION

1. Field of the Invention

The present invention relates to a DC motor driver for use in a driving source for an image forming device or the like, and more particularly to avoidance of braking action when switching phases of the motor.

2. Description of the Related Art

FIGS. 4 and 5 are drawings for explaining a motor driver of prior art.

FIG. 4 is a circuit block diagram of a three-phase DC motor driver of the prior art. Reference numeral 1 denotes a three-phase DC motor and numeral 2 designates a motor driver for supplying electric current to a winding U phase 3, a winding V phase 4 and a winding W phase 5 of the three-phase DC motor 1. An FG pattern 6 is adapted to output a signal of a frequency proportional to a number of revolutions of the three-phase DC motor 1. In an FG amplifier 7 for converting signals to pulse signals, the signal output from the FG pattern 6 is wave-shaped to be converted to an FG signals 8. The FG signal 8 is input into a speed discriminator 9 for controlling the number of revolutions of the motor, in which the FG signal 8 is compared with a previously provided reference FG period to output an acceleration signal 12 or a deceleration signal 13 so that the number of revolutions of the motor may become a set number of revolutions. Reference numeral 10 designates a crystal oscillator generating a reference clock for the speed discriminator 9. The reference FG period is sent to the speed discriminator 9 by a reference FG period signal 70. Reference numeral 19 denotes an ON/OF signal for starting or stopping the DC motor.

A charge pump 14 serves to charge and discharge electric current into and from a charge pump capacitor 15 and a charge pump capacitor 16 in accordance with the acceleration signal 12 and the deceleration signal 13 so that an error in number of revolutions is converted to DC voltage. A resistance 17 will adjust phases of return amount from the DC motor. A torque amplifier 20 amplifies the difference between the DC voltage and a reference voltage 21 to output a signal to a current limiting comparator 18 that detects excess current when overloading. A current limiting resistance 51 converts current value of the DC motor 1 to voltage that is detected at the inversion terminal of the current limiting comparator 18, and if the detected value is more than a reference voltage 52, the current is cut off. In other words, if excess current is applied to the DC motor 1, the current is cut off so that the current becomes less than a set current value. With the exception of being overloading, the output from the torque amplifier 20 is directly output into a hall amplifier 22 and a PWM generator 23.

In accordance with a DC voltage level of the output of the torque amplifier 20, the hall amplifier 22 amplifies outputs from a hall element U phase 24, a hall element V phase 25 and a hall element W phase 26 to output the amplified signals into a PWM comparator U phase 27, a PWM comparator V phase 28 and a PWM comparator W phase 29. The hall elements 24, 25 and 26 are supplied with current from a 24 voltage power source 30 through hall element biasing resistances 31 and 32 to output positional information of the rotor as voltage waveforms.

The PWM generator or PWM drive circuit 23 produces a PWM signal 33 as a reference for switching drive of the DC motor 1. The frequency of the PWM signal 33 is set by a PWM frequency setting resistance 34 and a PWM frequency setting capacitor 35.

Outputs of the hall amplifier 22 and the PWM drive circuit 23 are sent to the PWM comparators 27, 28 and 29 for the respective phases. The PWM comparators 27, 28 and 29 compare the output of the hall amplifier 22 with the output of the PWM drive circuit 23. If the output of the hall amplifier 22 is more than that of the PWM drive circuit 23, the comparators output an H level signal to supply current (or power) to the motor. Reversely, if the output of the former less than that of the latter, the comparators output an L level signal to cut off the supply of the current (or power). In other words, an ON__duty ratio for the switching drive of the DC motor 1 is determined.

Reference numeral 85 designates a printer driver for driving an upper FET__U phase 36, an upper FET__V phase 37 and an upper FET__W phase 38 and a lower FET__U phase 39, a lower FET__V phase 40 and a lower FET__W phase 41 in accordance with the outputs of the PWM comparators 27, 28 and 29. A Zener diode U phase 42, a Zener diode V phase 43 and a Zener diode W phase 44 protect gate to source connections from voltage when the respective phases are at high impedance.

Reference numeral 45 denotes a booster circuit for switching the upper transistors (36, 37 and 38) for the respective phases. A voltage waveform output from a boosting oscillator 46 is bypassed to the next step by a by-pass capacitor 47 so that the voltage waveform is rectified by a rectifier diode 48, biased to the power-supply voltage by a DC bias diode 49 and smoothed by a booster capacitor 50.

FIG. 5 is a time chart for explaining a principle for supplying sinewave current to the motor windings (3, 4 and 5) to control the supply capability to the motor depending upon loads being applied. Reference numerals 55, 56 and 57 designate artificial or pseudo sinewaves obtained by amplifying the amplitudes of output voltages of the hall element U phase 24, hall element V phase 25 and hall element W phase 26 by an amplification factor proportional to the output voltage of the charge pump 14 at the respective phases. Reference numeral 58 denotes a triangular wave produced by the PWM drive circuit 23. The PWM comparators 27, 28 and 29 compare the artificial sinewaves 55, 56 and 57 with the PWM triangular wave 58 to produce coil applying voltage waveforms 59, 60 and 61 at the respective phases, thereby applying voltages to the windings of the respective phases. Numerals 62, 63 and 64 indicate winding currents to be supplied to the windings 3, 4 and 5 of the DC motor 1 by the coil applying voltages.

In the motor driver of the prior art, however, the following problems remain to be solved.

According to the characteristics of a usual DC motor, when voltage is applied to its windings, current flowing through the windings is only progressively increasing under the influence of inductance value of the windings and induced voltage of the motor. In other words, the current flowing through the windings tends to rise behind the voltage applied to the windings. When the current lags behind the voltage, the winding current 72 also lags in phase behind the winding voltage 71 by a time as shown at 74 in FIG. 6. Due to the delay in phase, therefore, the current flowing direction (or the power supplying direction) of the windings may not be completely switched during the switching of magnetic poles of the rotor magnets so that there is a time in which current (or power) is supplied to apply a force in a direction opposite to the rotating direction of the rotor. This phenomenon will be referred to herein as "braking action 73".

In order to solve this problem, it has been proposed that hall elements for detecting the position of a rotor are mounted in the rotor to be advanced relative to a stator (referred to hereinafter as "shift mounting") as shown in FIG. 7 wherein the shifted amount is shown at 75. In this manner, the switching of the phases is effected earlier than the switching of the magnetic poles inherently effected by the rotor so that the switching point 76 for switching the current flowing in and out of the windings may become in coincidence with the point for switching the magnetic poles inherently effected by the rotor. According to the "shift mounting" of the hall elements, no braking action occurs so that the maximum motor efficiency may be achieved. In this case, however, when the motor is about to be started, the induced voltage is not yet generated because the motor is under inoperative condition. Namely, as shown in FIG. 8 there is little or no phase difference between the winding applying voltage and the winding current in contrast with the case of normal rotation of the motor. When the hall elements are shift-mounted under no phase difference condition, the braking action would occur as shown at 77 in FIG. 8, leading to reduced starting torque which is a further problem.

SUMMARY OF THE INVENTION

Under the circumstances, it is an object of the invention to provide a DC motor driver for driving a DC motor in sinewave power-on driving with shift-mounted hall elements for detecting its rotor position, which eliminates braking action occurring in switching phases when starting the motor to prevent starting torque from being reduced.

The present invention is directed to a DC motor driver for driving a DC motor in which hall elements are mounted by shifting, with respect to a stator, a mounting position of the hall elements for detecting a position of a rotor, comprising an FG pattern for outputting a pulse wave of a period proportional to a number of revolutions of the DC motor, an FG amplifier for producing an FG signal proportional to the number of revolutions of the DC motor on the basis of the output of the FG pattern, a speed discriminator circuit for comparing a period of the FG signal with a preset period to output a signal corresponding to an error in the number of revolutions of the DC motor, a charge pump circuit for converting the output of the speed discriminator circuit into DC voltage, a first hall amplifier for amplifying the amplitude of output voltage of the hall elements so as to be proportional to the DC voltage of the charge pump, a second hall amplifier for producing a rectangular wave on the basis of the output voltage of the hall elements, an F/V converter for converting the frequency of the FG signal into DC voltage, selecting means for selecting the first hall amplifier when output voltage of the F/V converter is equal to or more than a preset threshold voltage, and selecting the second hall amplifier when the output voltage of the F/V converter is less than the preset threshold voltage, a PWM comparator for producing a power-on pattern for switching the driving of the DC motor by comparing the output voltage of the first hall amplifier or the second hall amplifier selected by the selecting means with a reference triangular wave for PWM modulation, and current amplification transistors for supplying current to windings of the DC motor in accordance with the output of the PWM comparators.

The above and further objects, features and effects of the present invention will be apparent from the following detailed description and the accompanying drawings.

DETAILED DESCRIPTION OF THE PREFERRED EMBODIMENTS

Figure 1:
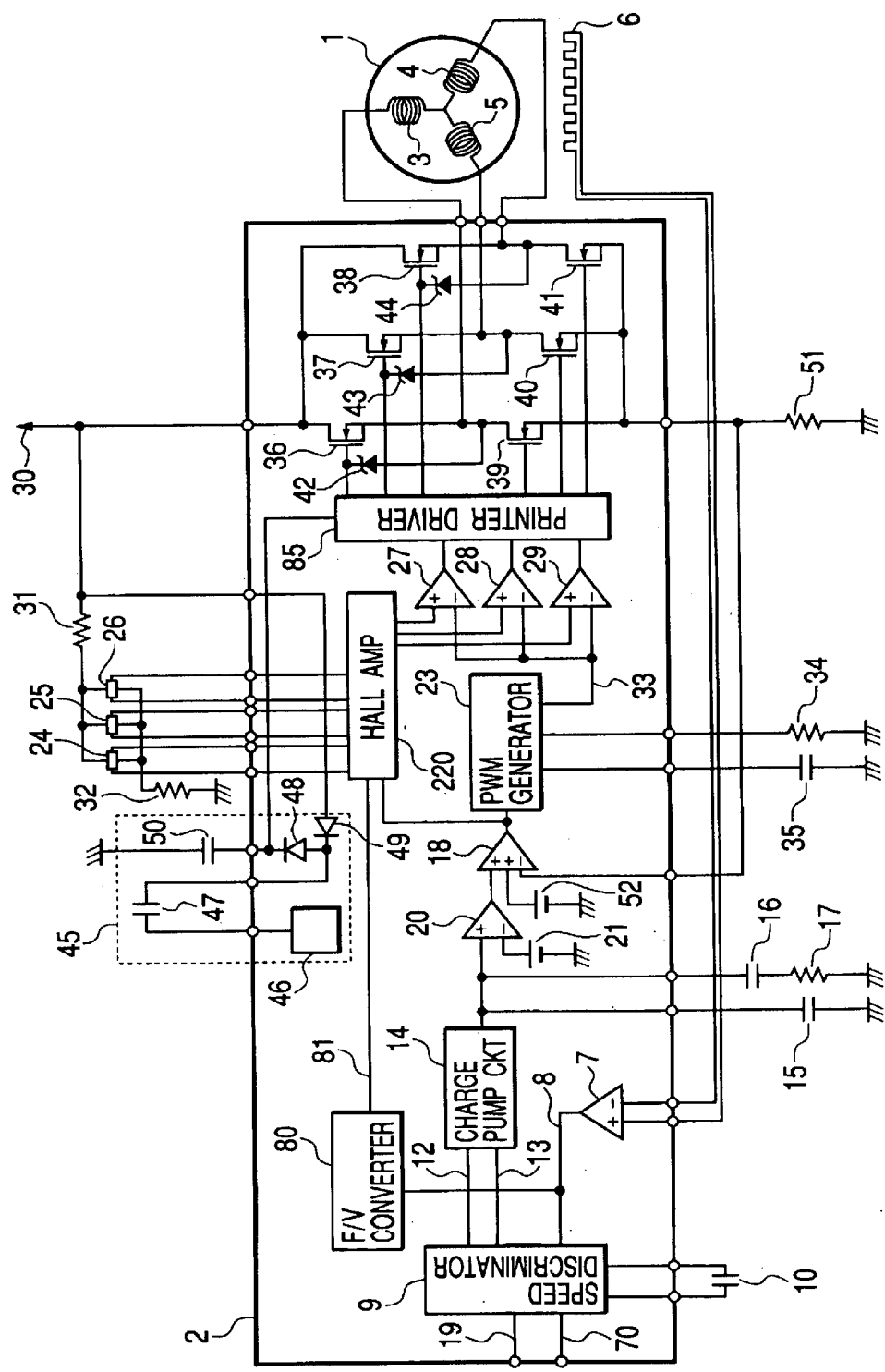
FIG. 1 is a block diagram illustrating the constitution of the circuit of the first embodiment of the invention.

FIG. 1 is a block diagram illustrating a constitution of the "DC motor driver" of one embodiment of the invention for explaining the features for preventing a reduction in starting torque in the case using a DC motor in a sinewave power-on driving.

FIG. 1 illustrates a three-phase DC motor 1 and a motor driver 2 according to the invention for supplying current of a sinewave to a winding U phase 3, a winding V phase 4 and a winding W phase 5 of the DC motor 1 in a manner to mitigate vibrations of the three-phase DC motor 1. An FG pattern 6 outputs a signal of a frequency proportional to a number of revolutions of the three-phase DC motor 1. In an FG amplifier 7 for converting signals to pulse signals, the signal output from the FG pattern 6 is wave-shaped to be converted to an FG signal 8. The FG signal 8 is input into a speed discriminator 9 for controlling the number of revolutions of the motor and an F/V converter 80 for converting the number of revolutions of the DC motor 1 to DC voltage. The speed discriminator 9 compares the received FG signal with a previously provided reference FG period to output an acceleration signal 12 or a deceleration signal 13 so that the number of revolutions may become the set number of revolutions. A crystal oscillator 10 generates a reference clock for the speed discriminator 9. The F/V converter 80 generates an F/V converter output signal 81 obtained by converting the number of revolutions to DC voltage. The reference FG period is sent to the speed discriminator 9 by a reference FG period signal 70. Reference numeral 19 denotes an ON/OF signal for starting and stopping the DC motor 1. A charge pump circuit 14 serves to charge and discharge electric current into and from a charge pump capacitor 15 and a charge pump capacitor 16 in accordance with the acceleration signal 12 and the deceleration signal 13 so that an error in number of revolutions is converted to DC voltage. A resistance 17 will adjust phases of return amount from the DC motor. A torque amplifier 20 amplifies the difference between the DC voltage and a reference voltage 21 to output a signal to a current limiting comparator 18 that detects excess current when overloading. A current limiting resistance 51 converts current value of the DC motor to voltage that is detected at the inversion terminal of the current limiting comparator 18, and if the detected value is more than a reference voltage 52, the current is cut off. In other words, if excess current is applied to the DC motor 1, the current is cut off so that the current becomes less than a set current value. With the exception of being overloading, the output from the torque amplifier 20 is directly output into a hall amplifier 220 and a PWM generator 23.

The hall amplifier 220 performs switching 120° rectangular wave power-on driving and sinewave power-on driving according to the output voltage threshold which is set in the F/V converter 80. Namely, when less than the threshold, the 120° rectangular wave power-on is effected, while when more than the threshold, the sinewave power-on is effected as discussed below.

The 120° rectangular wave power-on will be explained hereafter. In the event that the sinewave power-on is selected by the hall amplifier 220, the waveform of voltage obtained from the hall element U phase 24, hall element V phase 25 and hall element W phase 26 is shaped into a rectangular waveform. Such a current is supplied to the windings of the DC motor 1 in 120° regions about the center of magnet poles. In other words, depending on the output voltage of the hall elements, the waveform is produced and the current is supplied to the DC motor.

The sinewave power-on will be explained below.

When the sinewave power-on is selected by the hall amplifier 220, the outputs from the hall element U phase 24, hall element V phase 25 and hall element W phase 26 are amplified to output them into a PWM comparator U phase 27, a PWM comparator V phase 28 and a PWM comparator W phase 29 in accordance with a DC voltage level of the output of the torque amplifier 20. In other words, amplitudes of the output voltages of the hall elements are amplified to be proportional to the DC voltage of the charge pump and output them. The hall elements 24, 25 and 26 are supplied with current through hall element biasing resistances 31 and 32 from a 24 volt power source 30.

The PWM drive circuit 23 produces a PWM signal 33 as a reference for switching drive of the DC motor 1. The frequency of the PWM signal 33 is set by means of a PWM frequency setting resistance 34 and a PWM frequency setting capacitor 35.

Outputs of the hall amplifier 220 and the PWM driving circuit 23 are sent to the PWM comparators 27, 28 and 29 of the respective phases. The PWM comparators 27, 28 and 29 compare the output of the hall amplifier 220 with the output of the PWM driving circuit 23, and if the output of the fall amplifier 220 is more than that of the PWM driving circuit 23, the PWM comparators 27, 28 and 29 output an H level signal to supply current (or power) to the motor 1. Reversely, if the output of the former is less than that of the latter, they output an L level signal to cut off the supply of current (or power). In other words, the ON_duty ratio for switching drive of the DC motor 1 will be determined.

Reference numeral 85 designates a printer driver for driving an upper FET_U phase 36, an upper FET_V phase 37 and an upper FET_W phase 38 and a lower FET_U phase 39, a lower FET_V phase 40 and a lower FET_W phase 41 in accordance with the outputs of the PWM comparators 27, 28 and 29. A Zener diode U phase 42, a Zener diode V phase 43 and a Zener diode W phase 44 protect gate to source connections from voltage when the respective phases become at high impedance.

Reference numeral 45 denotes a booster circuit for switching the upper transistors (36, 37 and 38) for the respective phases. A voltage waveform output from a boosting oscillator 46 is bypassed to the next step by a by-pass capacitor 47 so that the voltage waveform is rectified by a rectifier diode 48, biased to the power supply voltage by a DC bias diode 49 and smoothed by a booster capacitor 50.

Figure 2:
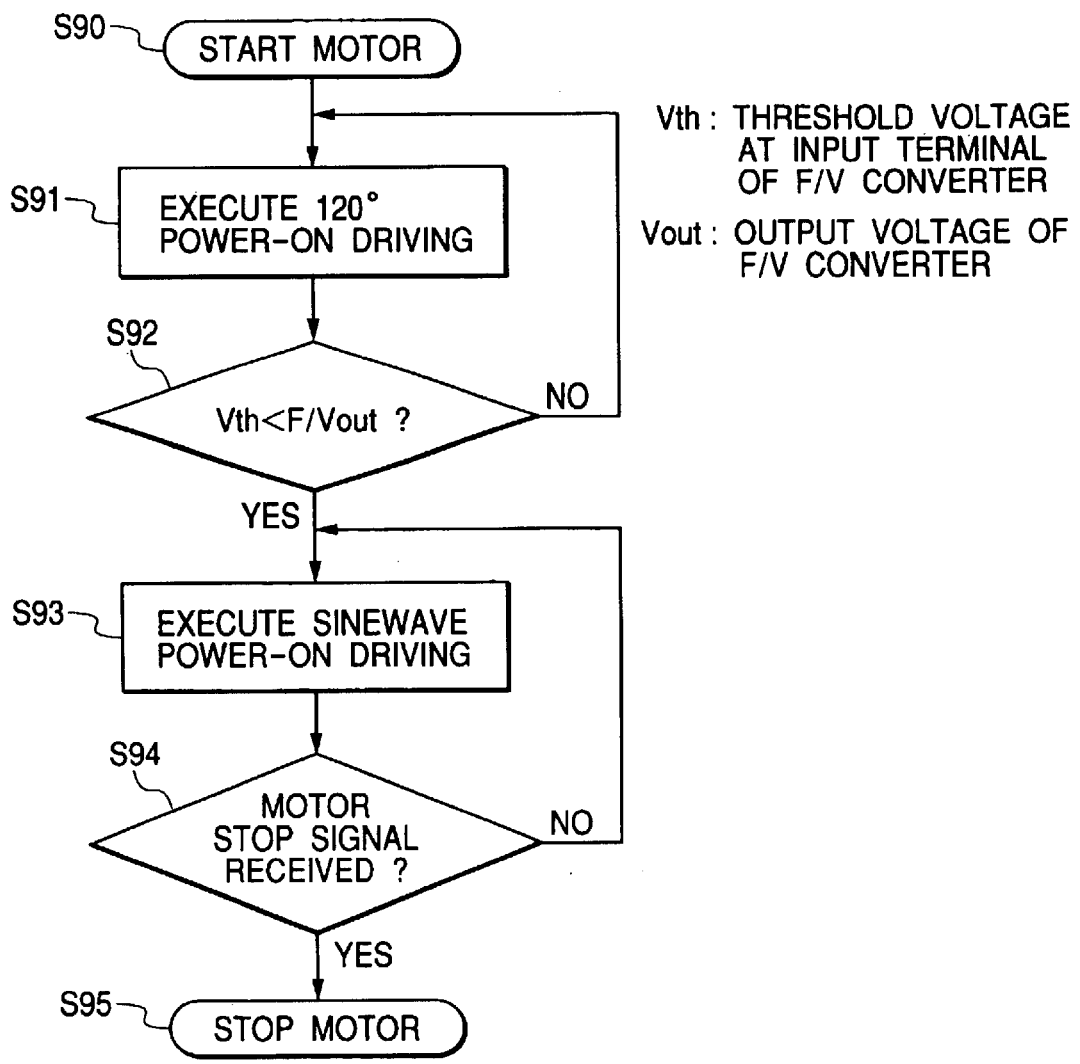
FIG. 2 is a flow chart showing a method for switching power-on driving in starting a motor.

FIG. 2 is a flow chart illustrating a method for switching power-on driving when the DC motor is started.

When a start signal is input into the DC motor 1 (refer to the steps 90 in the drawing, where steps are simply designated by "S"), the motor is driven by 120° power-on driving (steps 91). The output voltage of the F/V converter 80 rises with an increase in number of revolutions of the DC motor 1. When the output voltage 81 of the F/V converter 80 rises to a level equal to or more than the threshold voltage $V_{th}$, set by the hall amplifier 220 (steps 92), the driving is switched to the sinewave power-on driving (steps 93). On receiving a motor stop signal (steps 94), the DC motor 1 is stopped (steps 95). As this sequence is provided to avoid the braking action in the case that the motor is started in the sinewave power-on driving, the value of $V_{th}$ will set the voltage at which the braking action occurs in the case of starting in the sinewave power-on driving. In fact, the value of $V_{th}$ is experimentally obtained. In general, a number of revolutions of the order of one half of the rated number of revolutions is enough to be sure not to encounter the braking action even with the sinewave power-on driving.

Figure 3:
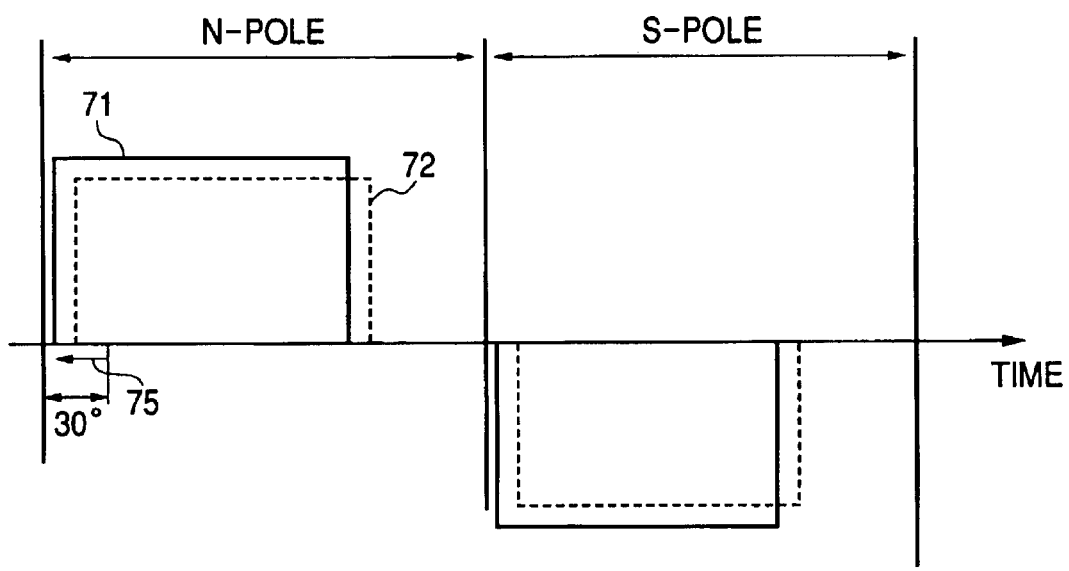
FIG. 3 is a time chart illustrating a relation between winding voltage and winding current in 120° rectangular wave power-on driving when starting a motor.
Figure 4:
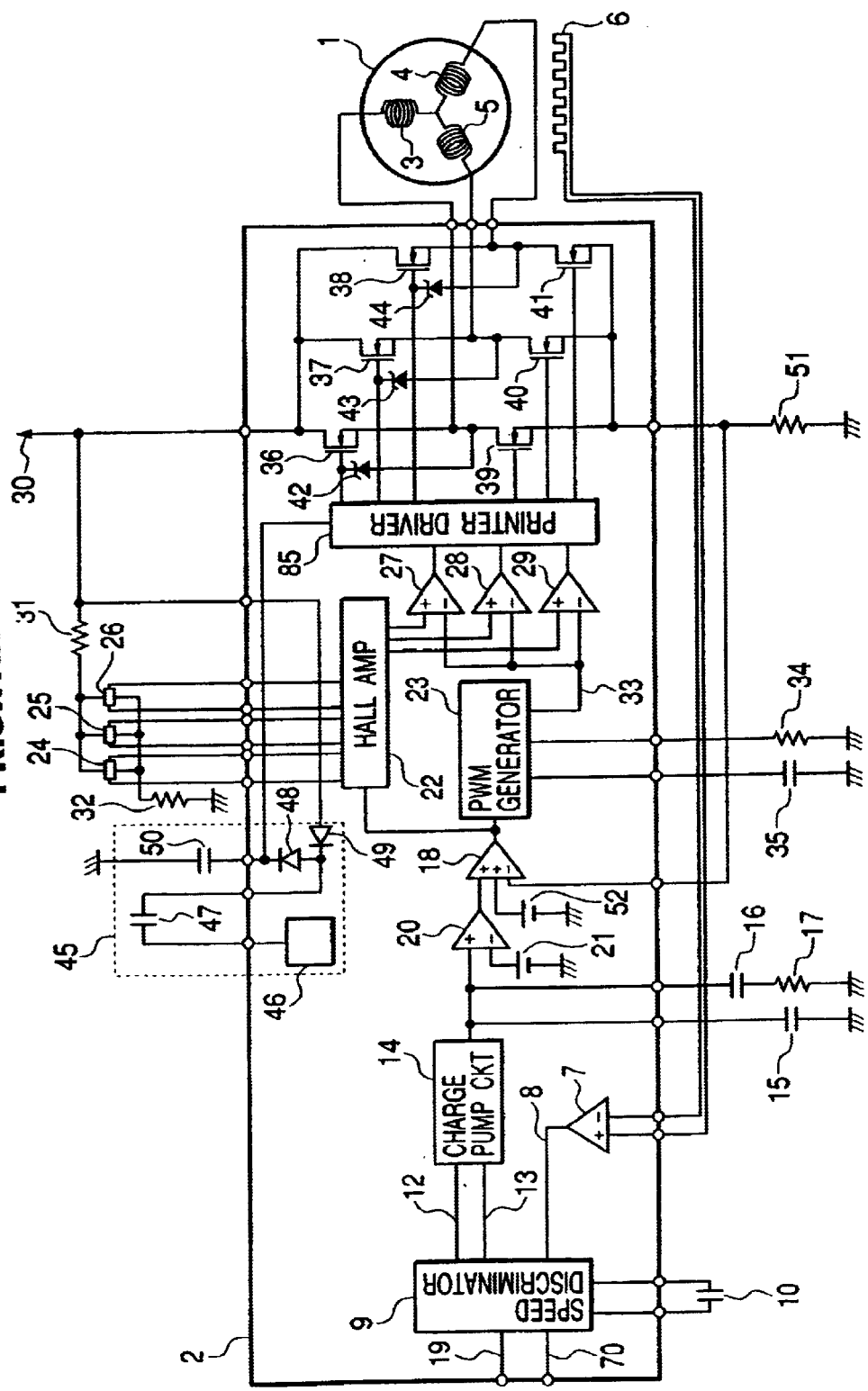
FIG. 4 is a block diagram illustrating the constitution of the circuit of the prior art.
Figure 5:
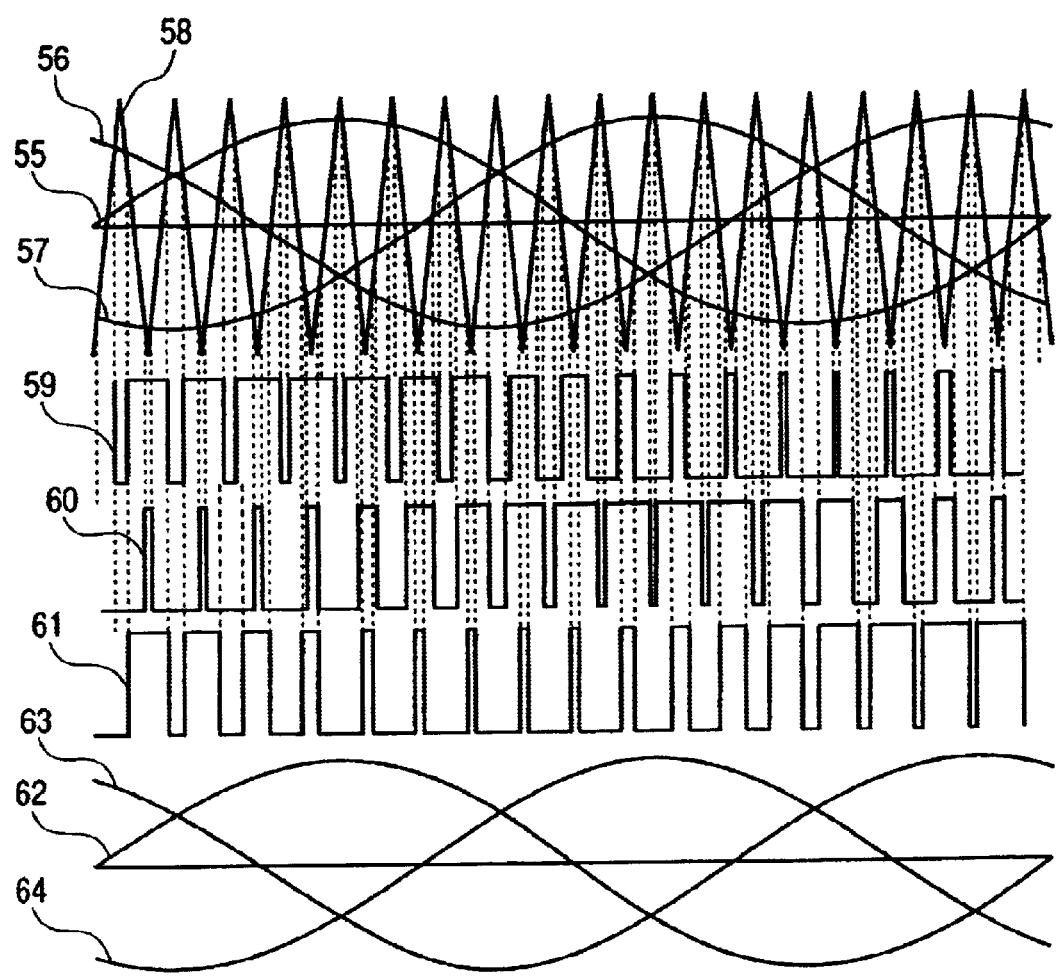
FIG. 5 is a time chart illustrating a principle for controlling supply capability to a motor.
Figure 6:
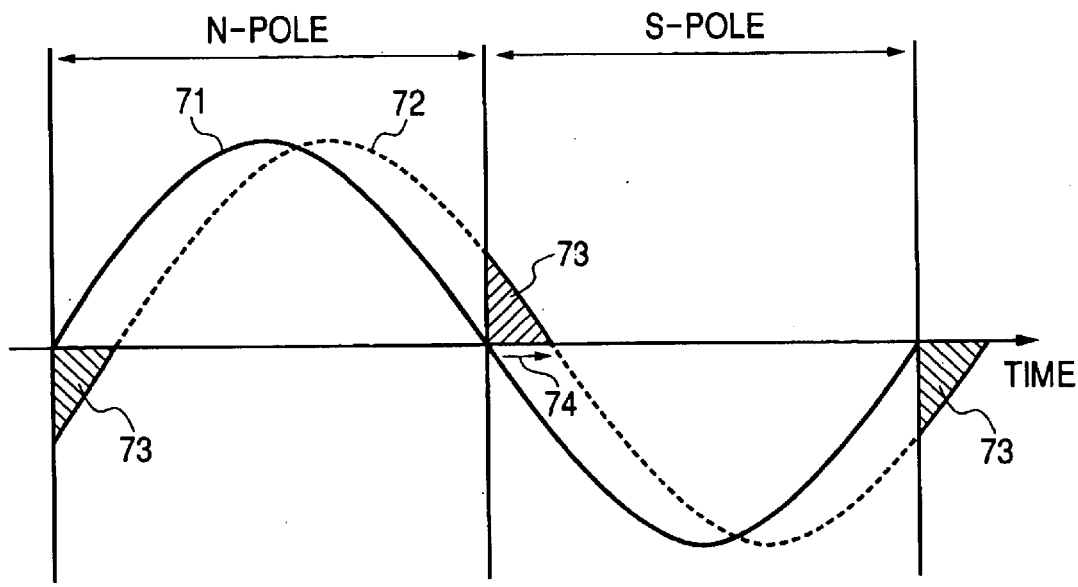
FIG. 6 is a time chart for explaining the mechanism causing the braking action.
Figure 7:
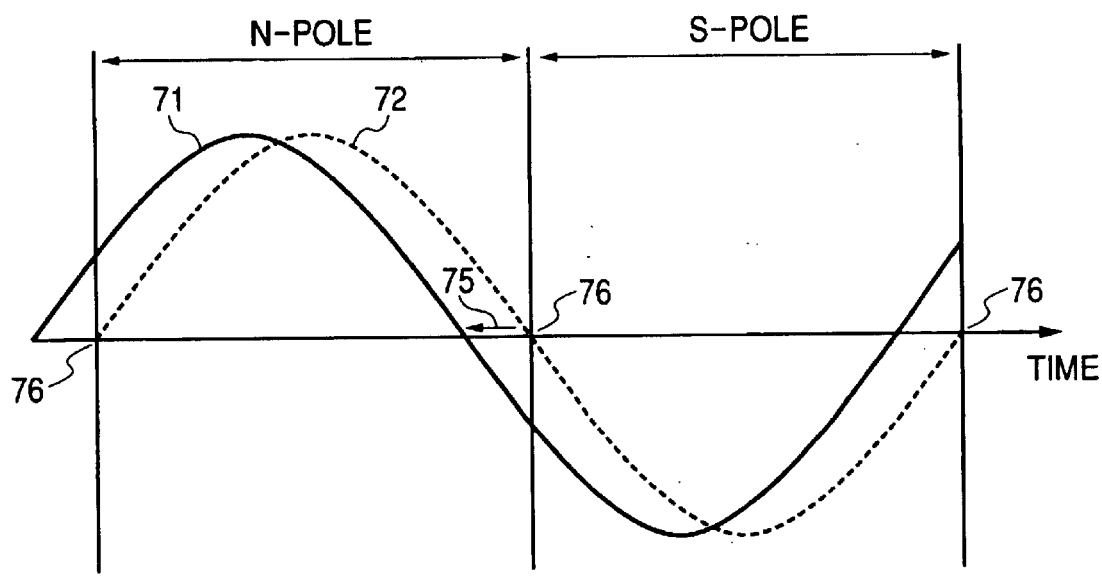
FIG. 7 is a time chart for explaining the avoidance of the braking action by shift-mounting of hall elements.
Figure 8:
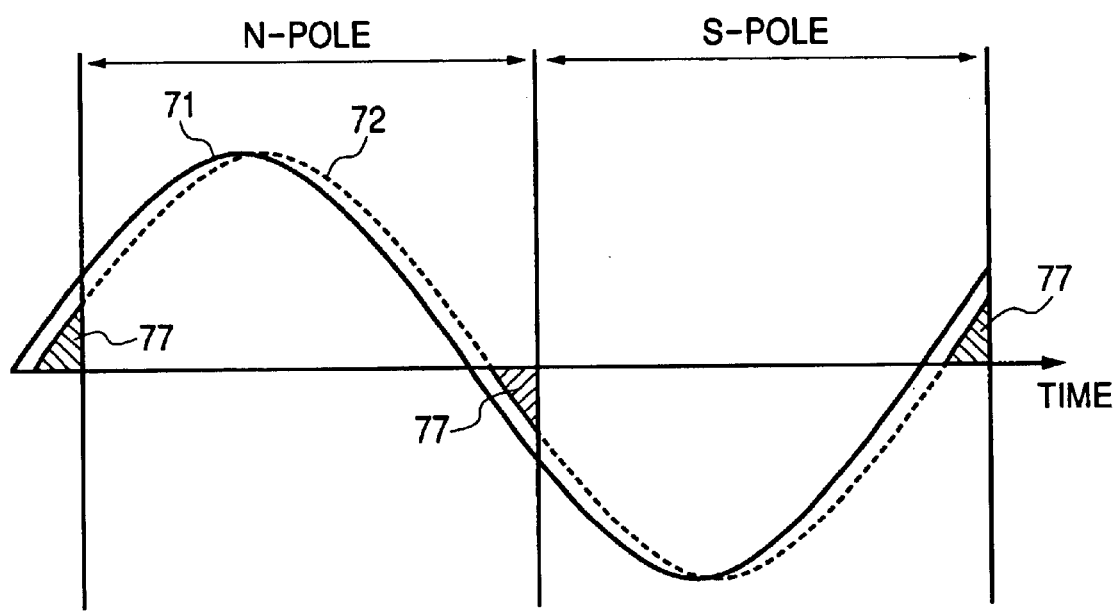
FIG. 8 is a time chart illustrating the occurrence of the braking action caused by the shift mounting of hall elements when starting a motor.

FIG. 3 is a time chart illustrating a behavior of winding voltage 71 and winding current 72 in the 120° rectangular wave power-on driving at starting. In comparison with the sinewave power-on driving, as no braking action, motor efficiency is prevented from lowering and a larger starting torque can be realized than in the sinewave power-on driving.

As can be seen from the above description, according to the embodiment of the invention, by executing the 120° rectangular wave power-on driving only when starting, a motor can be started without lowering the starting torque.

While the F/V converter is used as motor rotating speed detecting means in the illustrated embodiment, it will be apparent that other speed detecting means may be used without limiting the F/V converter. For example, counting of the FG periods or hall element outputs can judge whether the motor has been started or a number of revolutions of the motor has attained a predetermined number of revolutions. The rectangular power-on driving is not limited to be of 120° and can be carried out within a suitable power-on range without causing any braking action.

Although the three-phase DC motor is driven in the embodiment, it is to be understood that the invention may also be applicable to n phase DC motors (n is a natural number equal to or more than three) in the same manner in the above embodiments. In that case, 360°/n may be used in substitution for 120° of the rectangular wave power-on driving.

As described above, according to the invention execution of the rectangular wave power-on driving only for starting a motor can avoid the undesirable braking action occurring in switching phases so that the reduction in starting torque may be eliminated.

While the invention has been particularly shown and described with reference to the preferred embodiments thereof, it will be understood by those skilled in the art that the invention is not limited these embodiments, and various changes and modifications can be made within the scope of the appended claims.

What is claimed is:

1. A DC motor driver for driving a DC motor in which hall elements are mounted by shifting, with respect to a stator, a mounting position of the hall elements for detecting a position of a rotor, comprising:
   an FG pattern for outputting a pulse wave of a period proportional to a number of revolutions of the DC motor,
   an FG amplifier for producing an FG signal proportional to the number of revolutions of the DC motor on the basis of the output of the FG pattern, a speed discriminator circuit for comparing a period of the FG signal with a preset period to output a signal corresponding to an error in the number of revolutions of the DC motor, a charge pump circuit for converting the output of the speed discriminator circuit into DC voltage, a first hall amplifier for amplifying the amplitude of output voltage of the hall elements so as to be proportional to the DC voltage of the charge pump, a second hall amplifier for producing a rectangular wave on the basis of the output voltage of the hall elements, an F/V converter for converting the frequency of the FG signal into DC voltage, selecting means for selecting the first hall amplifier when output voltage of the F/V converter is equal to or more than a preset threshold voltage, and selecting the second hall amplifier when the output voltage of the F/V converter is less than the preset threshold voltage, a PWM comparator for producing a power-on pattern for switching the driving of the DC motor by comparing the output voltage of the first hall amplifier or the second hall amplifier selected by the selecting means with a reference triangular wave for PWM modulation, and current amplification transistors for supplying current to windings of the DC motor in accordance with the output of the PWM comparators.

2. The DC motor driver according to claim 1, wherein the threshold voltage is set to voltage of one half of voltage obtained at the time of a rated number of revolutions of the DC motor.

* * * * *

UNITED STATES PATENT AND TRADEMARK OFFICE
CERTIFICATE OF CORRECTION

PATENT NO. : 6,922,029 B2
DATED : July 26, 2005
INVENTOR(S) : Hiroshi Fuse

It is certified that error appears in the above-identified patent and that said Letters Patent is hereby corrected as shown below:

Column 1,
Line 8, "to" should read -- for --.
Line 24, "signals" should read -- signal --.
Line 52, "overloading," should read -- overloaded, --.

Column 2,
Line 11, "less" should read -- is less --.

Column 3,
Line 8, "become in" should be deleted.
Line 9, "coincidence" should read -- coincide --.

Column 4,
Line 65, "overloading," should read -- overloaded, --.

Column 5,
Line 55, "become at" should read -- reach --.

Column 6,
Line 41, "manner" should read -- manner as --.

Signed and Sealed this

Twenty-ninth Day of November, 2005

JON W. DUDAS
*Director of the United States Patent and Trademark Office*